Oct. 8, 1968    A. E. VAN LANGERMEERSCH    3,405,041
METHOD AND APPARATUS FOR ANODIC VOLTAMMETRY
Filed Dec. 16, 1963
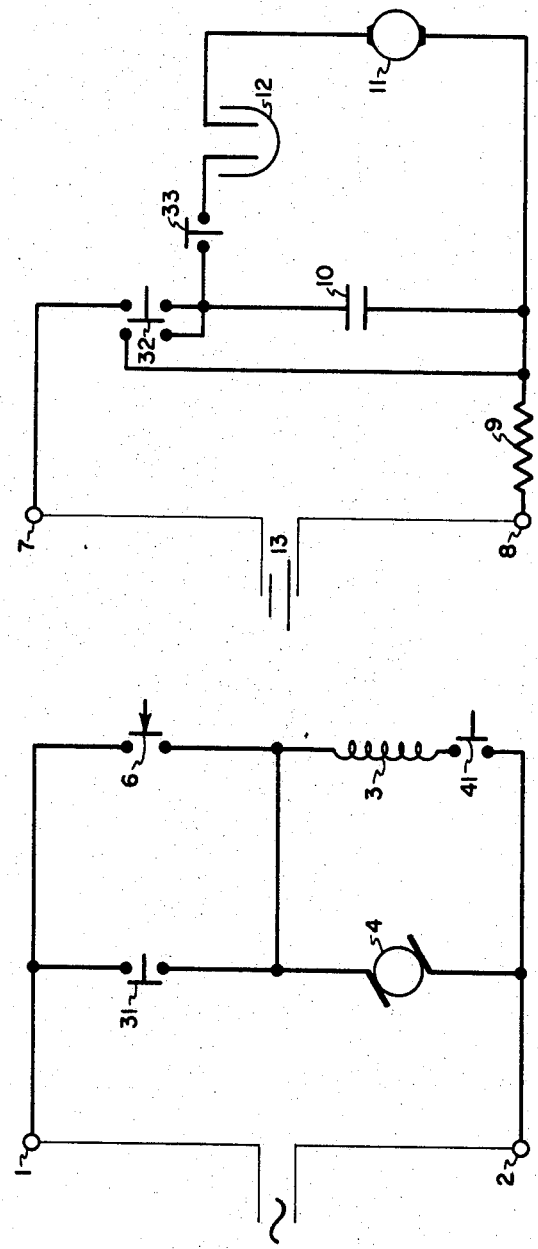
ANDRÉ E. VAN LANGERMEERSCH  Inventor
By
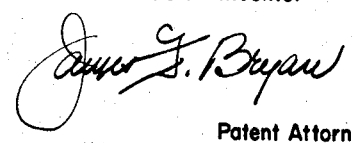
Patent Attorney

United States Patent Office 3,405,041
Patented Oct. 8, 1968

3,405,041
METHOD AND APPARATUS FOR ANODIC VOLTAMMETRY
André E. Van Langermeersch, Mont-Saint-Aignan, France, assignor to Esso Standard Societe Anonyme Francaise, Paris, France, a corporation of France
Filed Dec. 16, 1963, Ser. No. 330,863
Claims priority, application France, Dec. 20, 1962, 919,323
8 Claims. (Cl. 204—1)

ABSTRACT OF THE DISCLOSURE

The instant disclosure is directed to a method and apparatus for chemical analysis by anodic voltammetry. According to the teachings of the instant disclosure, a linearly increasing voltage is applied across the terminals of an electrolytic cell and the current passing through the cell is measured as a function of voltage. The linearly increasing voltage is obtained by applying a constant voltage for a predetermined time across the cell, a current measuring device and a high resistance in series in order to charge a condenser of high capacity which is connected in parallel with the cell and current measuring device.

The invention relates to a process and apparatus for chemical analysis, and is particularly concerned with a process and apparatus for anodic voltammetry.

Anodic voltammetry is a method derived from polarography; the voltage-current curve at the terminals of an electrolytic cell is recorded in a short time (from 5 to 40 seconds as a rule), the voltage being a linear function of time. Platinum micro-electrodes are employed instead of the mercury drop electrode used in a polarograph, which constitutes a simplification, but when the rest of the high speed polarograph apparatus is used this is most expensive. The method, however, furnishes results in certain cases where classic polarography does not, especially for a number of organic products.

An object of the present invention is to carry out anodic voltammetry with a simple and inexpensive apparatus, having moreover a greater flexibility of use than a high-speed polarograph.

According to the invention a method of chemical analysis by anodic voltammetry, in which a linearly increasing voltage is applied across the terminals of an electrolytic cell and the current passing through the cell is measured as a function of voltage, comprises applying a constant voltage for a predetermined time across the cell, the current measuring device and a high resistance in series in order to charge a condenser of high capacity in parallel with the cell and current measuring device.

Also according to the invention an apparatus for anodic voltammetry comprises an electrolytic cell in series with a current measuring device and a high resistance, a condenser of high capacity connected in parallel with the cell and current measuring device, and means for applying a constant voltage for a predetermined time across the cell, current measuring device and high resistance in series in order to charge the condenser.

According to a preferred form of the invention, the high resistance has a value in the range from 50 kilohms to 10 megohms and the condenser has a value in the range from 1000 to 10000 microfarads.

The constant voltage may, for example, be in the range from 100 to 500 volts and may be switched on for a time of, for example, from 5 to 120 seconds by means of a time switch. At the end of this time, the condenser is preferably discharged substantially instantaneously by a short circuit, so that the voltage across the cell falls to zero. The apparatus is then ready for a further experiment. The maximum current measured by the current measuring device may readily be recorded for each experiment.

Further characteristics and advantages of the present invention will be apparent from the following description referred to the accompanying drawing showing by way of example a preferred embodiment of the invention.

The motor 4 of a time-switch is fed by the main supply (110 or 220 volts A.C.) connected to terminals 1 and 2 by means of a working contact 31 of the relay 3. On pressing the push-button 6, the relay 3 closes the contact 31 and the motor 4 starts. Contacts 32 and 33 are closed simultaneously, and by means of the source of stabilized direct voltage 13 connected to the terminals 7 and 8, the condenser 10 is charged through the resistance 9, the electrolysis vessel 12 is supplied with a linearly increasing voltage and the microammeter 11 deflects. It is moreover possible, by means of switches that are not shown in the figure, to select several values of the condenser 10 and the resistance 9.

The complete theory of operation would be extremely difficult to explain, since the electrolytic vessel 12 does not display a resistance according to Ohm's law. However, if this vessel and the microammeter are replaced by a resistance $r$, R being the value of the resistance 9, C the value of the condenser 10, E the constant electromotive force of the source 13, $i$ the current in 11, $j$ the current in 10, I the current in 9 and Q the charge on the condenser, it is possible to establish the following four equations:

$$I = i + j \qquad (1)$$

$$J = \frac{dQ}{dt} \qquad (2)$$

$$Q = Cri \qquad (3)$$

$$E = RI + ri \qquad (4)$$

Equations 1, 2 and 3 lead to the relationships:

$$i = \frac{Q}{Cr} \qquad (5)$$

and $$I = \frac{Q}{Cr} + \frac{dQ}{dt} \qquad (6)$$

On entering these values in (4), we obtain the differential equation:

$$E = R\left(\frac{Q}{Cr} + \frac{dQ}{dt}\right) + \frac{Q}{C}$$

which may be written $$R\frac{dQ}{dt} + \frac{R+r}{Cr}Q = E$$

with the initial condition $t=0$, $Q=0$ whose solution is:

$$Q = \frac{ECr}{R+r}\left(1 - e^{-\frac{R+r}{CRr}t}\right)$$

whence, by Equation 5

$$i = \frac{E}{R+r}\left(1 - e^{-\frac{R+r}{CRr}t}\right)$$

By expanding the expression in brackets as a series, we obtain the value of the voltage V at the terminals of C. If this expansion be restricted to three terms we obtain:

$$V = ri = \frac{E}{R+r}\left[\left(\frac{R+r}{CRr}\right)t - \frac{1}{2}\left(\frac{R+r}{CRr}\right)^2 t^2 + \frac{1}{6}\left(\frac{R+r}{CRr}\right)^3 t^3\right]$$

that is to say $$V=\frac{Et}{CR}\left[1-\left(\frac{R+r}{2CRr}\right)t+\frac{1}{6}\left(\frac{R+r}{CRr}\right)^2 t^2\right]$$

which expression approximates to the linear function:

$$V=\frac{E}{CR}t$$

provided that $t$ is very much less than $$\frac{2CRr}{R+r}$$

In practice, $r$ is very much less than R and $$\frac{2CRr}{R+r}$$

which may be written as:

$$\frac{2Cr}{1+\frac{r}{R}}$$

is therefore little different from 2 Cr. Taking $C=8000$ microfarads and $r=10$ kilohms, the foregoing condition becomes $t \ll 16 \times 10^{-3} \times 10^4 = 160$ seconds.

Under these conditions, therefore, it is a rough approximation that during times not exceeding 30 seconds the voltage rise will be a linear function of time.

At the end of the time set on the time switch, the contact 41 associated with the motor opens, the reay 3 is de-energized, the contact 31 opens, thus stopping the motor, the contact 33 disconnects the voltage from the electrolysis vessel 12 and the microammeter 11, and the reversing switch 32 disconnects the voltage from the condenser 10 which discharges by a short-circuit. The maximum deviation of the microammeter is read and the apparatus is ready for a further measurement.

Examples

By using this apparatus, several methods of determination have been performed:

(1) Determination of cadmium in an aqueous medium (KCl N/10). Resistance R, 50 kilohms—capacity C, 6000 μF.; time $t$, 20 seconds; concentration range $10^{-5}$ to $10^{-4}$ gram equivalent per litre.

(2) Determination of mercury in an aqueous medium (acetic acid). Same values of R, C and $t$ as in (1). Concentration range $10^{-4}$ to $5 \times 10^{-3}$ gram equivalent per litre.

(3) Determination of copper in an aqueous medium (KCl N/10). Resistance R, 200 kilohms; capacity C, 2000 microfarads; time $t$, 20 seconds. Range of concentration $10^{-4}$ to $5 \times 10^{-3}$ gram equivalent per litre.

(4) Determination of ditertiary butyl paracresol in a methyl alcohol solution (HCl N/100). Resistance R, 100 kilohms; capacity C, 4000 microfarads; time $t$, 20 seconds. Range of concentration $5 \times 10^{-4}$ to $5 \times 10^{-3}$ gram equivalent per litre.

(5) Determination of heptyl aldehyde in a methyl alcohol solution (HCl N/100). Same values of R, C and $t$ and same range of concentration as in (4).

What is claimed is:

1. A method of chemical analysis by anodic voltammetry, in which a linearly increasing voltage to be applied across the terminals of an electrolytic cell is obtained by charging a condenser through a high resistance comprising, applying a constant voltage for a predetermined time across the cell, a current measuring device and a high resistance in series in order to charge a condenser of high capacity in parallel with the cell and the current measuring device; and measuring the current through the cell with the current measuring device.

2. A method according to claim 1, in which the high resistance has a value in the range from 50 kilohms to 10 megohms and the condenser has a value in the range from 1000 to 10,000 microfarads.

3. A method according to claim 1, in which the constant voltage is in the range from 100 to 500 volts and is applied for from 5 to 120 seconds.

4. An apparatus for anodic voltammetry comprising an electrolytic cell having a first terminal and a second terminal, a current measuring device, having a first terminal and a second terminal, the first terminal of said cell being electrically connected to the first terminal of said current measuring device, a condenser of high capacity having a first terminal and a second terminal, said first terminal of said condenser being electrically connected to said second terminal of said cell and said second terminal of said condenser being electrically connected to said second terminal of said current measuring device, a high electrical resistance having a first terminal and a second terminal, said first terminal being electrically connected to the second terminal of said condenser and means for applying a constant voltage for a predetermined time, said means having a first terminal electrically connected to the second terminal of said resistance and a second terminal electrically connected to the first terminal of said condenser.

5. An apparatus according to claim 4, in which the high resistance has a value in the range from 50 kilohms to 10 megohms and the condenser has a value in the range from 1000 to 10,000 microfarads.

6. The apparatus of claim 4 wherein means are provided for discharging said condenser after applying said constant voltage for said predetermined time.

7. The apparatus of claim 6 further characterized in that said means for applying a constant voltage includes a timer for determining the time during which said constant voltage is applied.

8. The method of claim 3 further characterized in that said current measuring means includes a galvanometer and means for determining the maximum deviation of said galvanometer.

References Cited

Milner, "The Principles and Applications of Polarography," 1957, pp. 87–89.

Kolthoff et al., "Polarography," 2nd edition, volume 1, 1952, pp. 323–326 and 399–406.

JOHN H. MACK, *Primary Examiner.*

T. TUNG, *Assistant Examiner.*